(12) United States Patent
Haufe et al.

(10) Patent No.: US 8,095,331 B2
(45) Date of Patent: Jan. 10, 2012

(54) TRANSACTION BASED VERIFICATION OF A SYSTEM ON CHIP ON SYSTEM LEVEL BY TRANSLATING TRANSACTIONS INTO MACHINE CODE

(75) Inventors: Christian Haufe, Dresden (DE); Ingo Kuehn, Dresden (DE); David Larsen, Boulder, CO (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 469 days.

(21) Appl. No.: 12/324,212

(22) Filed: Nov. 26, 2008

(65) Prior Publication Data

US 2009/0144675 A1 Jun. 4, 2009

Related U.S. Application Data

(63) Continuation-in-part of application No. 12/122,017, filed on May 16, 2008, now abandoned.

(30) Foreign Application Priority Data

Nov. 30, 2007 (DE) .......................... 10 2007 057 681
Sep. 9, 2008 (DE) .......................... 10 2008 046 397

(51) Int. Cl.
*G01R 31/00* (2006.01)
*G06F 17/50* (2006.01)
(52) U.S. Cl. ...................................... 702/117; 716/106
(58) Field of Classification Search .................... 702/35, 702/117, 119, 188; 703/13, 16, 17, 20, 22; 716/4, 5, 106
See application file for complete search history.

(56) References Cited

U.S. PATENT DOCUMENTS

| 6,658,633 B2 | 12/2003 | Devins et al. ..................... 716/5 |
| 7,376,917 B1* | 5/2008 | Lazarut et al. ................ 716/106 |
| 2007/0016880 A1 | 1/2007 | Brinson et al. .................... 716/5 |
| 2009/0144012 A1* | 6/2009 | Haufe et al. ................. 702/117 |

OTHER PUBLICATIONS

Pasricha et al., "Extending the Transaction Level Modeling Approach for Fast Communication Architecture Exploration," *DAC '04 Proceedings of the 41st Annual Design Automation Conference*, Jun. 7-11, 2004, pp. 113-118.
Shin et al., "A SystemC Transaction Level Model for the MIPS R3000 Processor," *SETIT 2007 4th International Conference: Sciences of Electronic, Technologies of Information and Telecommunications*, Mar. 25-29, 2009, pp. 1-8.
Translation of Official Communication from German Patent Office for German Patent Application No. 10 2008 046 397.3-53 dated Aug. 3, 2010.

* cited by examiner

*Primary Examiner* — John H Le
(74) *Attorney, Agent, or Firm* — Williams, Morgan & Amerson, P.C.

(57) ABSTRACT

In a transaction-based verification environment for complex semiconductor devices, enhanced verification efficiency may be achieved by providing a transaction to machine code translator and an appropriate interface that enables access of the translated machine code instruction by a CPU under test. In this manner, transaction-based test environments may have a high degree of re-usability and may be used for verification on block level and system level.

28 Claims, 8 Drawing Sheets

TRANSACTION BASED VERIFICATION OF A SYSTEM ON CHIP ON SYSTEM LEVEL BY TRANSLATING TRANSACTIONS INTO MACHINE CODE

CROSS-REFERENCE TO RELATED APPLICATION

This application is a continuation-in-part of application Ser. No. 12/122,017, filed May 16, 2008 now abandoned.

BACKGROUND OF THE INVENTION

1. Field of the Invention

The present disclosure generally relates to systems and techniques for testing semiconductor devices in the form of hardware and/or software representations, and, more particularly, to systems and techniques for testing complex integrated circuits that include a central processing unit (CPU) and embedded peripheral devices connected to the CPU by internal bus systems to define a system on chip (SoC).

2. Description of the Related Art

In manufacturing semiconductor devices including a relatively complex circuitry, the testing of the device may represent a part of the manufacturing process, which has been underestimated a long time in terms of cost and effort required to obtain reliable data with respect to proper functionality and reliability of the device. In this respect, the manufacturing of the complex semiconductor device is to be understood to include the design of the device on the basis of a functional description of the desired functional behavior of the device, the various stages of providing a preliminary representation of the device in the form of a software model or a hardware prototype and respective re-designed versions thereof after encountering failures during verification, as well as the actual implementation of the finally established design in the semiconductor material. Thus, one reason in failing to meet specifications of the integrated circuit with respect to functional behavior may reside in design errors that may be identified and remedied by circuit verification on the basis of software simulation and/or prototype testing prior to mass production of the integrated circuits under consideration. An improper functionality of the integrated circuit may further be caused by the manufacturing process itself when the completed circuitry does not correspond to the verified circuit design, owing to process fluctuations in one or more of the large number of process steps involved during the processing. Although measurement and test procedures are incorporated at many points in the manufacturing process, it is nevertheless extremely important to ascertain the correct functioning of the final semiconductor device, since, according to a common rule of thumb, the costs caused by defective chips increase with each assembly phase by approximately one order of magnitude. For example, the costs caused by a defective circuit board including a faulty chip are typically significantly higher than identifying a defective chip prior to shipping and assembling the circuit board. The same holds true for a system, when a failure thereof is caused by one or more defective circuit boards as a downtime of an industrial system may result in averaged costs of approximately several hundred dollars per minute compared to a price of a few dollars for an integrated circuit chip having caused the defect.

Hence, there is a vital interest in developing test procedures to identify as many defects as possible in completed integrated circuits while not unduly increasing the total manufacturing costs. In particular, with the demand for more features and lower costs of circuits, there is a tendency to integrate a plurality of different circuit portions into a single chip to provide a complete system on a chip (SoC). A semiconductor device comprising various functional blocks may typically include, in addition to one or more logic blocks, one or more embedded memory portions, such as are used as on-chip cache for CPUs or as buffers for data packets that are transferred between different clock domains, and other peripheral components, such as complex I/O devices, dedicated functional blocks for efficient data processing of a specific type and the like, wherein these peripheral blocks are operatively connected to the CPU of the system via appropriate bus systems.

As discussed above, economic constraints force semiconductor manufacturers to not only minimize the defect level of the total manufacturing process, but also to provide, in combination with a reduced defect level, a high fault coverage so as to reduce the delivery of defective chips at reasonable cost for appropriate test procedures and techniques. For moderately complex integrated circuits, it has become standard practice to develop the basic design of the circuit while taking into consideration a plurality of constraints posed by effective test procedures. Moreover, typically, additional hardware resources are provided in the chip that may enable the identification of faulty circuit components for a broad class of operating conditions, wherein the additional hardware resources in combination with design specifics of the basic circuit and sophisticated test procedures and test patterns substantially determine the fault coverage of the test procedure.

In many circuit designs, the functional logic portion is tested by so-called scan chains, which represent a chain of flip-flops connected to a specific area of the functional logic in such a way that the functional logic or a specific area thereof may be initialized with a desired state that has previously been entered into the scan chain. In this case, the state of the logic block may be verified on the basis of the state of individual logic gates, which may be considered as a verification of the operational behavior of the logic block at register transfer level. However, with the advance of the semiconductor technology having arrived at transistor dimensions as low as approximately 40 nm and less, highly complex CPU designs are available including millions of logic gates, which makes it increasingly difficult to verify the proper functionality of the CPU at the register transfer level. Moreover, due to the incorporation of complex peripheral blocks, as explained above, additional efforts are required for identifying design flaws at an early manufacturing state prior to actually implementing mass production techniques.

Hence, the changing focus in the electronic industry from frequency scaling to enhancement with respect to functionality may contribute significantly to the overall complexity of the corresponding verification of semiconductor devices, thereby generating an increased demand for verification techniques that enable the testing of circuit designs at higher levels of abstractions compared to the registered transfer level, previously explained. For example, the verification complexity for register-based logic circuits rises as the square of the increase in the number of registers and thus by doubling the complexity of circuit implementation, for instance by advancing from one technology node to a future node, a four-fold impact on verification may result. In order to enable an efficient modeling of highly complex circuit designs of embedded hardware/software systems for estimating functional characteristics and performance behavior prior to the actual implementation of these systems, a plurality of different system description languages, such as SystemC, SpecC, System Verilog and the like, have been developed. However, in addition to providing appropriate and powerful description languages for modeling complex circuit designs, the verification may be performed on different abstraction levels to provide the possibility of reducing verification costs and allowing identification of design flaws and associating the same with deficiencies in architectural aspects or implementation-specific aspects. The modeling of complex circuit designs on a higher abstraction level compared to the register transfer level may, for instance, be accomplished by a transaction-based modeling technique that is based on combining various communication events to so-called transactions, thereby achieving a significantly higher degree of abstraction compared to the register transfer level of usual signals. That is, a transaction may be understood as a complete communication event, for instance, the transmission of a date or of a complete block of data wherein a respective communication event is ideally represented by the exchange of a single message within the transaction-based simulation model. In this way, enhanced simulation performance may be obtained compared to event-controlled simulation of signal-based communication protocols. The abstraction obtained by the transaction-based modeling technique may be associated with a reduced accuracy with respect to the timing within the simulated circuit since the various different protocol phases, which may be required during a respective transaction, may not be resolved, wherein, even for commonly used communication media, such as interface buses, a reduced degree of accuracy may result. That is, the timing for completing transactions may be monitored with a different degree of accuracy, depending on the modeling strategy used. For instance, cycle approximate models typically implement respective transactions such that the simulated time interval of activity may be closely related to the respective time required in an actual hardware implementation. However, precise resolving of the progression of different transactions may not be monitored and also the total duration of a single transaction, that is, active phases plus interruptions, may not be determined from the model. On the other hand, the total communication traffic on a respective bus may be determined with a sufficient accuracy. Consequently, by using a transaction-based verification, the estimation and testing of certain circuit components may be accomplished on a higher level compared to the level of bus signal changes, thereby enhancing the overall verification efficiency. For instance, transactions may typically be generated randomly so as to increase test coverage, while also providing the possibility of introducing specific constraints in order to exclude useless operational scenarios in the circuit component under test.

Conventional verification approaches for complex systems containing a central processing unit (CPU) usually split verification into verification of the CPU core and verification of the embedded peripheral functional components. After the verification of these components, an additional step of system verification may be performed to estimate and verify the functional behavior of the system as a whole.

With reference to FIGS. 1a-1c, a typical conventional approach for performing a verification process for a system on chip may be explained, wherein different levels of abstraction may be used.

FIG. 1a schematically illustrates a system 100 representing a complex semiconductor device in a respective state of the overall manufacturing process flow. That is, the system 100 may represent a semiconductor device at design state comprised of various functional modules, while one or more of the components of the system 100 may also be provided in the form of hardware-implemented prototypes, if deemed appropriate. For instance, the system 100 may comprise a central processing unit (CPU) 101, a peripheral functional block 102 and a memory controller 103, wherein these components may communicate with each other by a corresponding bus or interface system, which may be referred to as a crossbar switch (xbar) 105. As indicated above, the verification of the CPU 101 may be substantially based on assembly code generators which provide an assembly code in a more or less random manner while also including specific constraints in order to avoid inefficient phases during the verification of the CPU 101. The assembly code may then be translated into machine code that is supplied to the CPU 101 and also to a reference model so as to compare the results created by the assembly code in the CPU 101 and the reference model.

FIG. 1b schematically illustrates a test environment 150, which may also be referred to as a test bench that is configured to perform the above-described verification sequence. That is, the test environment 150 comprises a test case or test controller 151 connected to an assembler generator 152 for providing a randomized sequence of assembly structure which may optionally be controlled by the test case 151. Moreover, a module 153 representing respective verification constraints may be connected to the assembler generator 152 to incorporate specific limitations with respect to the randomness of the assembler code provided by the generator 152. Furthermore, a machine code converter 154 is connected to the assembler generator 152 in order to generate machine code on the basis of the input assembler code. As shown, the test case 151 may also be connected to the machine code converter 154 when predetermined test scenarios in the form of appropriately preselected assembler instruction sequences are to be used during the verification of the CPU 101. The machine code output by the machine code converter 154 may be stored in an appropriate memory device or memory model 155, from which the CPU 101 and an appropriate reference model 156 may retrieve machine code instructions executed by the CPU 101 and the reference model 156. The results obtained from the CPU 101 and the reference model 156 may be supplied to a check module 157, which may basically compare respective results and indicate any deviations in order to identify faults in the CPU 101.

FIG. 1c schematically illustrates a test environment 160 in the form of a transaction-based environment, which may be used for verification of the peripheral functional block 102, which may actually comprise a plurality of embedded peripheral components, as explained above. Thus, the test environment 160 is configured to stimulate the peripheral functional block on a higher level of abstraction, as previously explained, wherein respective transactions usually represent a plurality of protocol entities of the various bus interfaces in the system required for the operation of the peripheral functional block 102 within the system 100. For this purpose, the test environment 160 comprises a test case or controller 161 configured to control a transaction generator 162 so as to provide a sequence of transactions in order to obtain a desired high degree of test coverage. For instance, the test case 161 may control the transaction generator 162 to provide a more or less random stream of transactions, while specific limitations or constraints may also be imposed on the transaction generator 162 in order to avoid inefficient test scenarios. The transactions created by the generator 162 may be translated into appropriate signal waveforms for a bus, such as bus A connected to the peripheral functional block 102. The translation of transactions into appropriate bus signals may be accomplished by a bus functional model (BFM) 163 wherein, however, as previously explained, the time coordination of the transactions and the respective bus signal waveforms may depend on the underlying modeling strategy. The peripheral functional block 102 responds to transactions by respective signal waveforms provided on a respective bus interface B which in turn is connected to a monitor 164 that is configured to convert the bus signals into transactions. Similarly, the bus signals of bus A may be supplied to a monitor 165 which may convert the bus signals into transactions which may then be forwarded to a reference model 166 representing the expected behavior of the peripheral block 102.

In other cases, the monitor 165 may be omitted and the reference model 166 may be directly connected to the transaction generator 162. The transactions provided by the monitor 164, representing the response of the peripheral functional block with respect to the initial transactions obtained from the generator 162, are forwarded to a check module 167, which also receives the initial transactions via the monitor 165 or the transaction generator 162. Thus, a respective deviation of results from the reference model 166 and the peripheral functional block 102 may be estimated on transaction level in order to verify the operational behavior of the block 102. Moreover, a feedback may be implemented between the monitor 164 and the test case 161, for instance via an appropriate test coverage module 168, or any other appropriate functional module, which may therefore enable the test case 161 to adapt the stream of transactions produced by the generator 162 in response to the transactions obtained from the monitor 164. Thus, the stimulating transactions obtained from the generator 162 may be adapted "on the fly" with respect to the response of the peripheral functional block 102. It should be appreciated that, depending on the configuration of the peripheral block 102, a plurality of respective monitors and check modules may be provided so as to allow the evaluation of a plurality of individual components within the peripheral functional block 102. Thus, a high degree of test coverage may be obtained, for instance, on the basis of randomized yet constrained transaction streams, with a significantly reduced amount of verification time compared to a scenario operating on a less abstract level.

As previously indicated, the system 100 may be tested as a whole which may be accomplished by running a set of directed test scenarios from inside the simulated CPU 101 in order to address the embedded peripheral functional block 102, which, however, may result in a compromised functional coverage or reduced implementation of resources due to the very restrictive directed test scenarios. In other cases, the system 100 may be modified compared to the configuration as shown in FIG. 1a so as to further comprise an interface for a bus functional model in order to inject transactions into the system 100, in which case the CPU 101 may not be involved in verification at system level.

The present disclosure is directed to various methods and systems that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to techniques and systems for enhancing the efficiency of the verification process for semiconductor devices in a design state, which comprise a central processing unit (CPU), possibly in combination with embedded peripheral components. For this purpose, a transaction-based test environment may be provided in which transactions may be translated into machine code readable by the central processing unit. Thus, the CPU may be operated during verification in its native mode, thereby accessing the machine code obtained from the transactions generated in the test environment and thus enabling a transaction-based constraint-driven randomness during the verification procedure. Thus, by providing the transaction to machine code translator, the high level of abstraction of the transaction-based environment may be appropriately "lowered" in order to provide efficient verification of the CPU environment, while also maintaining the possibility of re-using the test environment for verification of embedded peripheral components using a transaction-based test strategy. Hence, enhanced test coverage and thus verification efficiency may be obtained for the central processing unit while, at the same time, providing the potential of re-usability of the transaction-based test environment for verification of a complex system by bypassing the transaction to machine code translator, if appropriate. In other aspects, the CPU may take part at the transaction-based functional verification of the embedded peripherals, thereby increasing the overall design test coverage by also verifying the CPU and the CPU interfaces as well as potential deadlocks/lifelocks.

One illustrative test environment disclosed herein is designed for verification of a design of the semiconductor device including a central processing unit and an interface system operatively connected to the central processing unit. The test environment comprises a transaction generator configured to generate a stream of transactions and a translator unit operatively connected to the transaction generator to receive the stream of transactions therefrom. The translator unit is configured to provide a machine code representation for each of the transactions in order to provide executable instructions for the central processing unit. The test environment further comprises a machine code interface configured to receive the machine code representations and to enable access to at least some of the machine code representations by the central processing unit. Additionally, the test environment comprises a transaction check unit configured to receive and verify a response transaction representing a response of the central processing unit.

One illustrative method disclosed herein relates to performing a transaction-based verification of a semiconductor device in a design state. The method comprises creating a first plurality of transactions representing communication events between a central processing unit and a peripheral functional block of the semiconductor device. The method further comprises generating machine code instructions from the first plurality of transactions, wherein the machine code instructions contain at least some instructions executable by the central processing unit. Moreover, the method comprises enabling access to the at least some executable instructions by the central processing unit and checking a response of at least one of the peripheral functional block and the central processing unit to obtain verification information, wherein the response is caused by executing the at least some instructions by the central processing unit.

A further illustrative method disclosed herein comprises configuring a transaction-based test environment to create a sequence of transactions that are appropriate for use in a semiconductor device to be tested, wherein the semiconductor device is in a design state and comprises at least a central processing unit. The method further comprises converting the sequence of transactions into machine code representations and operating the central processing unit on the basis of the machine code representations to verify a functional behavior of the semiconductor device.

BRIEF DESCRIPTION OF THE DRAWINGS

The disclosure may be understood by reference to the following description taken in conjunction with the accompanying drawings, in which like reference numerals identify like elements, and in which.

Figure 1A:
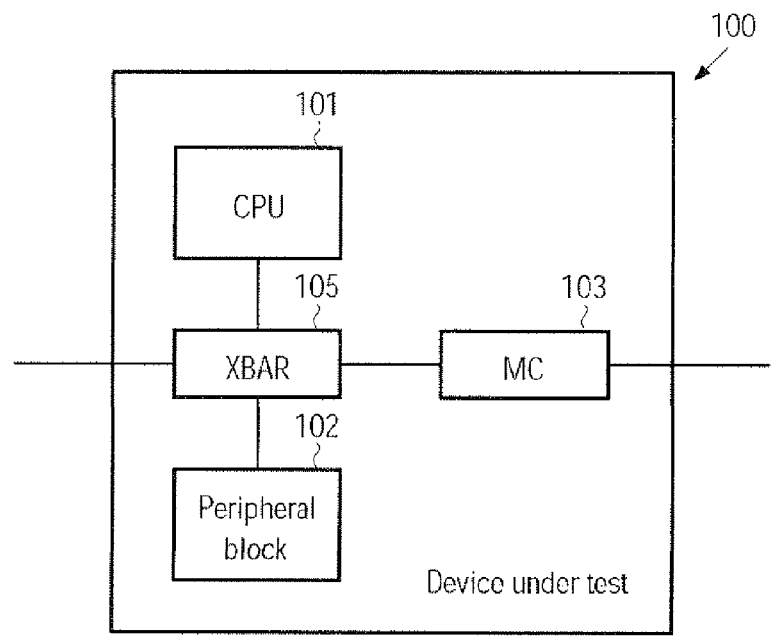
FIG. 1a schematically illustrates a semiconductor device in a design state that includes a central processing unit, a peripheral functional block and an interface system.
Figure 1B:
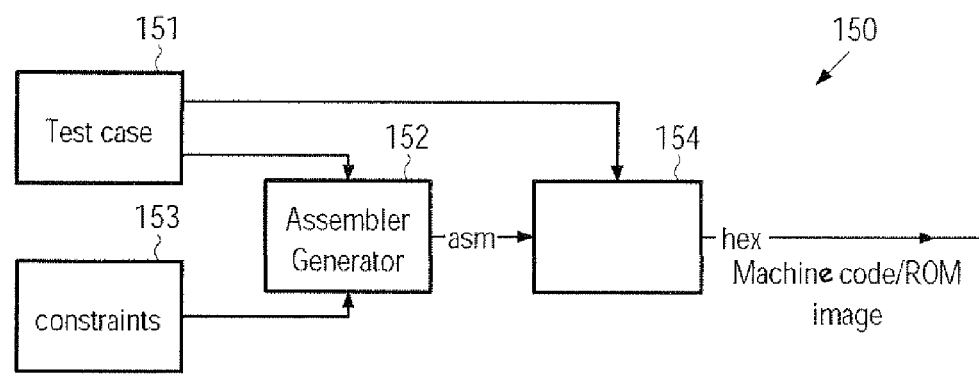
FIG. 1b schematically illustrates a test environment designed for verification of the central processing unit according to conventional strategies.
Figure 1B:
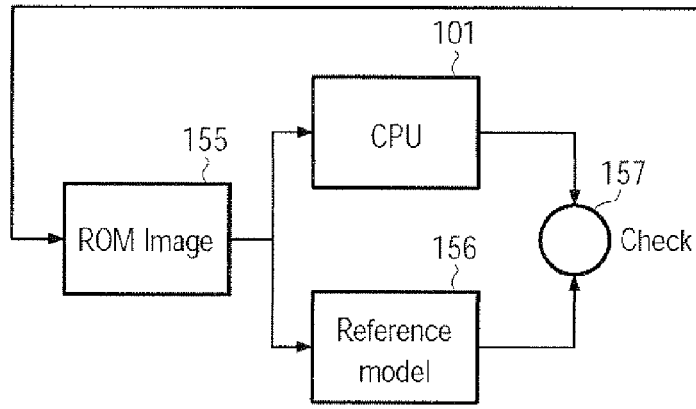

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to test benches or test environments operating on transaction level, thereby providing enhanced verification efficiency with respect to time and fault coverage compared to low level verification techniques, while additionally providing the potential for lowering the level of abstraction in order to enable the testing or verification of a central processing unit (CPU). For this purpose, the higher level of abstraction of the transaction-based test environment may be used for creating appropriate test scenarios, such as constraint-driven transaction streams, wherein respective responses may also be estimated on the level of transactions, while this high level resource may be made available for microprocessor verification by providing a transaction to machine code translator. Consequently, the test benches and test strategies disclosed herein may enable the verification of central processing units with high test coverage and high efficiency while also enabling an efficient re-use of the transaction-based test environment, thereby significantly reducing the overall effort for verification of complex semiconductor devices including CPUs and embedded peripheral function components. That is, CPU-based designs may be verified with high test coverage, while other embedded components may also be tested on transaction level, and these test environments may also be re-used in a test scenario with respect to the system as a whole.

Figure 2A:
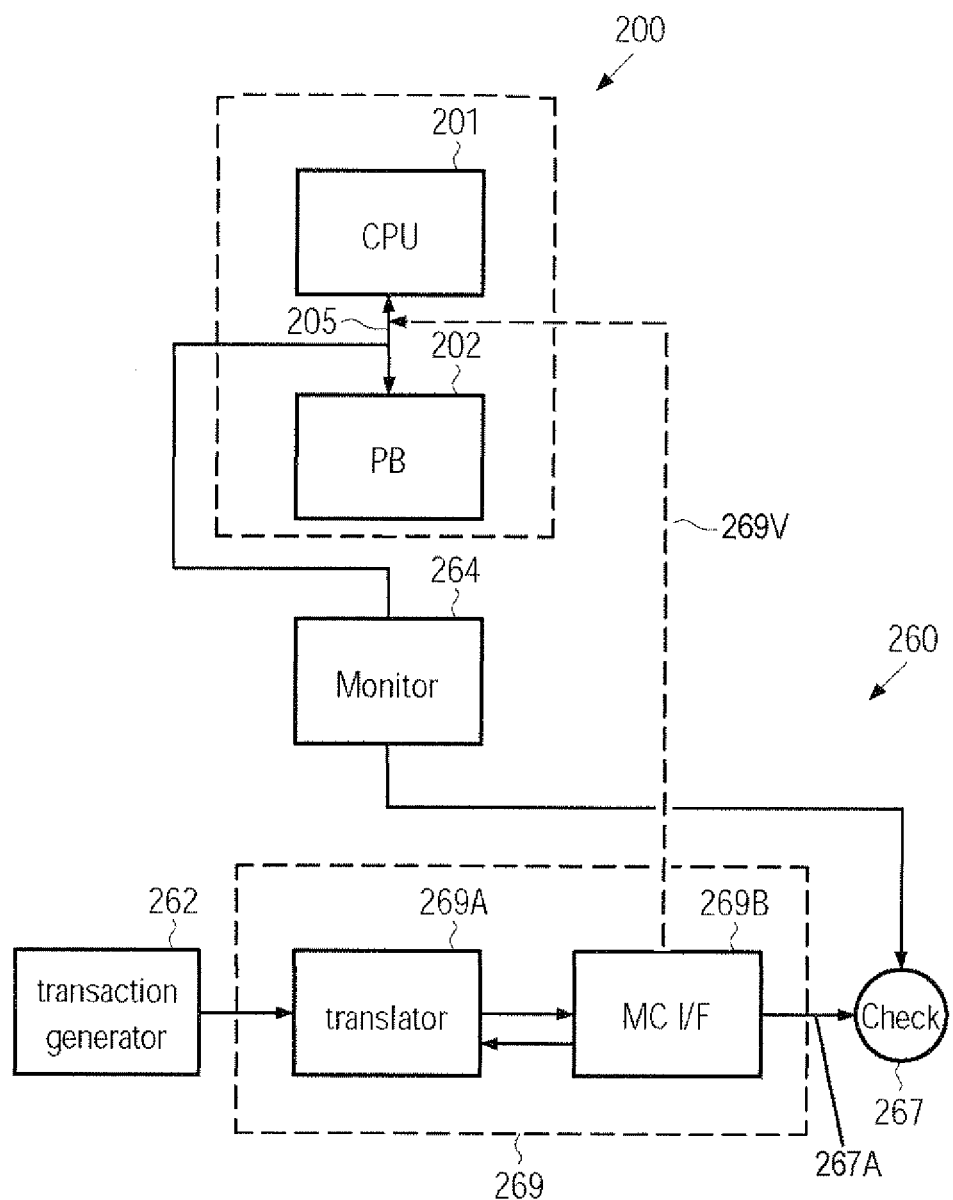
FIG. 2a schematically illustrates a transaction-based test bench or test environment including a transaction to machine code translator, according to illustrative embodiments.

FIG. 2a schematically illustrates a semiconductor device 200 in a design stage, that is, the semiconductor device 200 may be provided in the form of simulated circuit models and/or as hardware components, at least partially, depending on the overall strategy for developing and implementing the semiconductor device 200. The semiconductor device 200 may comprise a central processing unit (CPU) 201, which may represent any type of microprocessor-based circuit design that may be operated on the basis of a specified set of machine code instructions. As previously explained, the CPU 201 may include a large number of logic gates corresponding to the specified design, wherein, in advanced devices, the number of logic gates may amount to several million gates, and even more for advanced CPU cores, depending on the technology node. Furthermore, the device 200 may typically comprise an interface system 205, that is respective interface buses and the like, in order to connect the CPU 201 with other functional entities, such as memory devices, dedicated I/O interfaces, respective mixed signal circuit portions and the like. For convenience, any such embedded components may be referred to as embedded functional peripheral block 202.

As previously explained, the semiconductor device 200, i.e., the respective representation thereof in the form of software and/or hardware, may typically be tested with respect to its functional behavior prior to actually fully implementing the circuit configuration in hardware by means of volume production techniques. For this purpose, the semiconductor device 200 may be connected to a test environment 260, which may also be referred to as test bench, at any appropriate stage of the design of the semiconductor device 200. The test environment 260 may be provided in the form of a transaction-based environment which, as previously described, may be operated at an abstract level for communicating with the device 200 in order to inject appropriate stimulators, which in turn may result in a response of the device 200 or certain components thereof that may be evaluated in order to verify the functional behavior of the device 200 or individual components thereof. The test environment 260 may comprise a transaction generator 262 that is configured to provide a sequence or stream of transactions, each of which may represent a communication event between the CPU 201 and any peripheral component connected thereto via the interface system 205. Furthermore, the test environment 260 may comprise a module 269 configured to receive transactions from the generator 262, translate the transaction into machine code instructions readable to the CPU 201 and enable access via a communication link 269V to the translated machine code instructions by the CPU 201. For this purpose, the module 269 may comprise a transaction to machine code translator 269A in communication with a machine code interface 269B, which may be configured to enable access to the machine code instructions by the CPU 201. The translator 269A may, for instance, comprise an appropriate conversion function, for instance, in the form of a table or any other appropriate means in which a transaction is correlated with a respective representation of machine code instructions, wherein, typically, a plurality of machine code instructions may relate to a single transaction, as is previously explained. In some illustrative embodiments, the translator 269A may further comprise a randomization generator which may assign a specific machine code representation to an incoming transaction if more than one machine code representation is associated with the incoming transaction. In other cases, a transaction associated with two or more machine code representations, i.e., with two or more sequences of machine code instructions, may be converted into a respective sequence of machine code instructions including the members of several different machine code sequences of these representations, or even including all of the individual machine code instructions associated with the transaction under consideration. It should be appreciated that any other translation mechanism may also be used for the translator 269A.

Figure 1C:
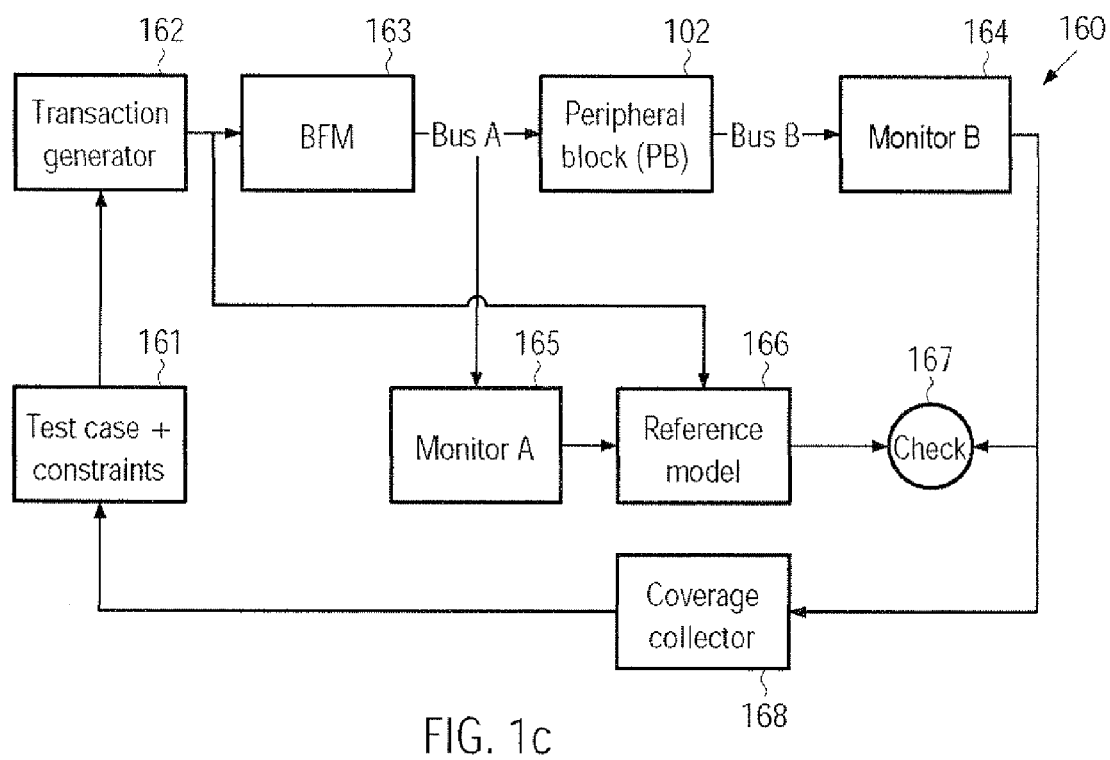
FIG. 1c schematically illustrates a transaction-based test environment configured to verify the peripheral functional block on a transaction level according to conventional verification techniques.

The test environment 260 may further comprise a check module 267 that is connected to a monitor module 264 which in turn may be connectable to the interface system 205 so as to receive signal waveforms and to convert the signals into transactions, which may be evaluated in the check module 267. For example, the transaction generator 262 and/or the module 269, i.e., the interface 269B, may be connected to a reference model, as previously explained with reference to FIG. 1c, which may also respond to the transactions provided by the generator 262 or to the machine code instructions provided by the interface 269B, thereby enabling a comparison between the responses provided by the monitor 264 and the respective reference model by the check module 267.

During operation of the transaction-based test environment 260, the device 200 is connected to the module 269 in the embodiment shown via the interface 269B and via the monitor 264, and the transaction generator 262 may provide an appropriate sequence of transactions, wherein the generation of the transactions may be controlled by a supervising control module, as will be described later on in more detail. Upon receiving the stream of transactions, the translator 269A may provide respective machine code instructions which are then supplied to the CPU via the interface 269B, wherein the CPU 201 may run in its native mode, thereby executing any executable instruction produced by the translator 269A. Based on the machine code instructions, the CPU 201 may address any peripheral components, such as the functional block 202, which may be sampled by the monitor 264, which provides respective translated response transactions to the check module 267.

Figure 2B:
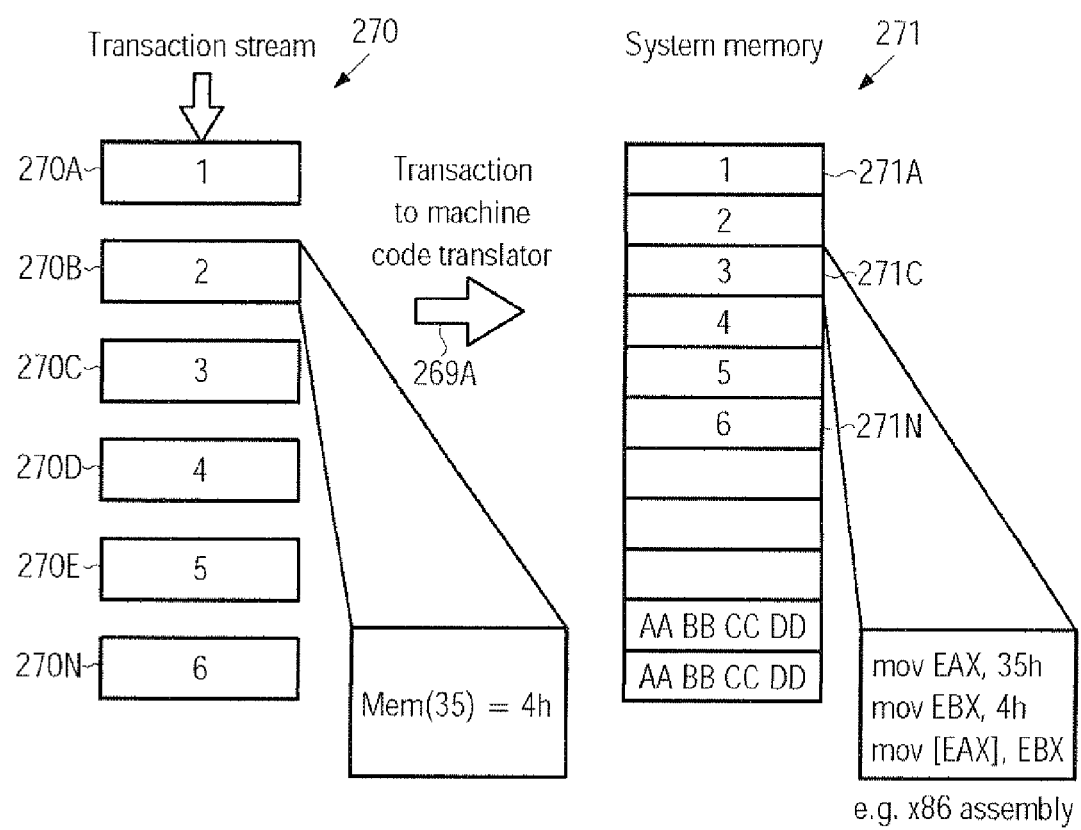
FIG. 2b schematically illustrates the conversion of a stream of transactions into machine code instructions executable by a CPU to be tested, according to illustrative embodiments.

FIG. 2b schematically illustrates a mutual interaction between the generator 262 and the translator 269A according to one illustrative embodiment. A stream of transactions 270A, 270B, 270C, 270D, 270E, 270N, collectively referred to as transactions 270, may be generated by the generator 262 and may be supplied to the translator 269A, which generates respective machine code instructions associated with each of the transactions 270. The machine code representations 271A, 271C, 271N, collectively denoted as machine code representations 271, may be stored in an appropriate memory device which may, for instance, be implemented in the interface 269B as shown in FIG. 2a, or any other appropriate memory area that may enable access by the CPU 201 during operation of the environment 260. Each of the machine code representations 271 may comprise one or more machine code instructions depending on the respective correlated transaction 270. For instance, as shown in FIG. 2b, the transaction 270B may correspond to a communication event for storing specific contents in a memory register, for instance register 35 is to be loaded with the value 4 h. Thus, the machine code representation 271C may include respective machine code instructions for writing into EAX and EBX registers of the CPU 201, when, for instance, applying the x86 instruction set. Thus, during operation, the CPU 201 may access a respective memory portion containing the machine code representations 271 and may execute these instructions, thereby providing a respective response for addressing peripheral components, wherein the response may be translated into transactions by the monitor 264.

Figure 2C:
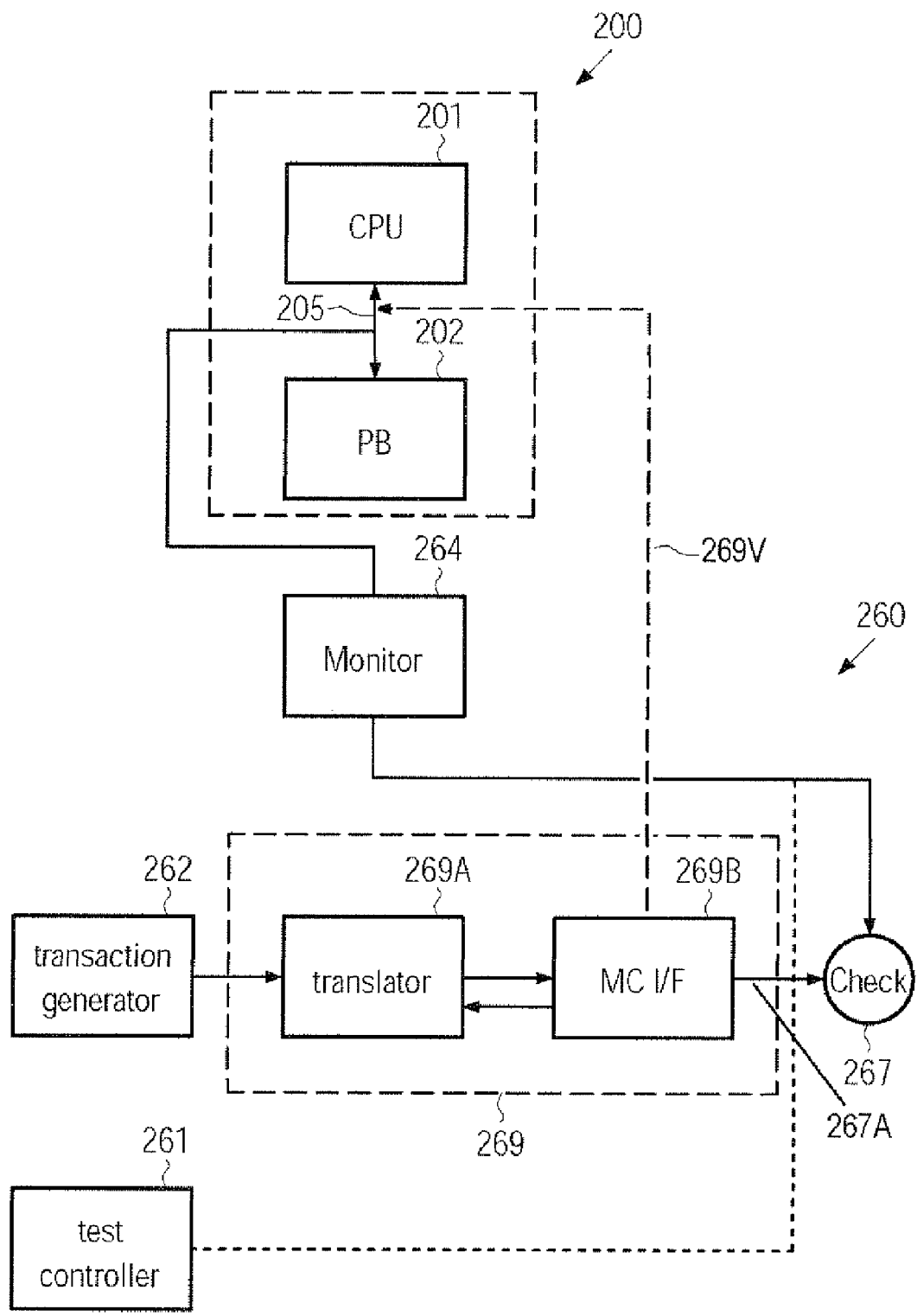
FIG. 2c schematically illustrates a transaction-based test environment including a transaction to machine code translator and a feedback loop to enable adaptation of the transaction stream to the response of the device under test, according to further illustrative embodiments.

FIG. 2c schematically illustrates the semiconductor device 200 connected to the transaction-based test environment 260 according to a further illustrative embodiment. In the embodiment shown, the environment 260 may comprise a test controller or test case 261 configured to control the transaction generator 262, for instance with respect to any test constraints, as previously explained. Furthermore, in one illustrative embodiment, the check module 267 and/or the monitor 264 may be connected to the test controller 261, thereby establishing a feedback loop which may enable an adaptation of the respective stream of transactions 270 "on the fly" depending on the response of the device 200.

With reference to FIGS. 2d-2g, further illustrative embodiments will now be described in more detail in which the interaction of the module 269 with the device 200 may be accomplished on the basis of a memory area, which may be implemented depending on the availability of memory models and requirements with respect to simulation speed when operating the environment 260.

Figure 2D:
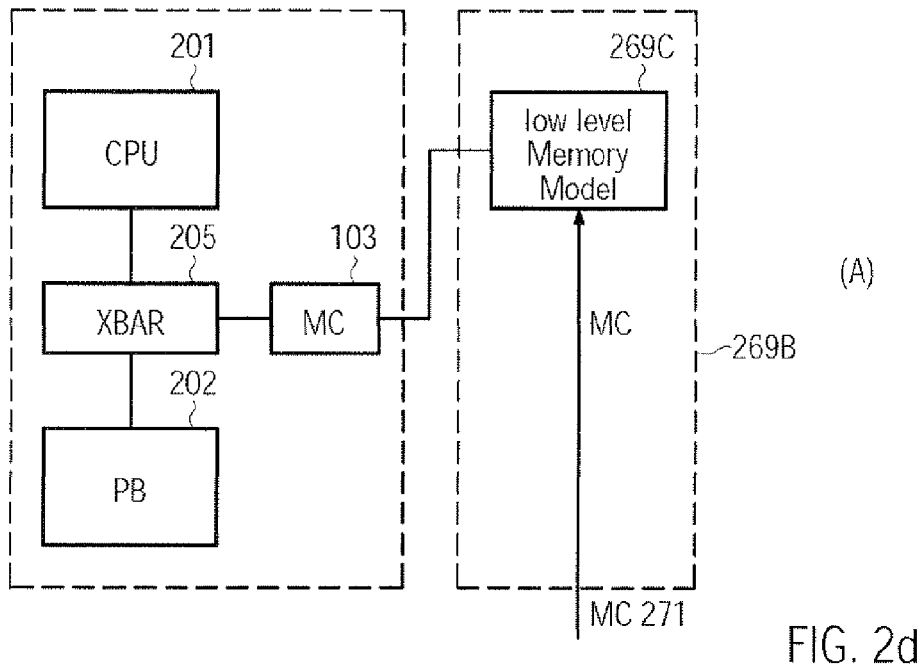
FIGS. 2d-2g schematically illustrate respective portions of the transaction-based test environment according to various alternatives in enabling access to the translated machine code instructions by the CPU under test, according to illustrative embodiments.

FIG. 2d schematically illustrates the interface 269B including a low level memory module 269C that may be fully accessible by the CPU 201, for instance via a memory controller 103 that is connected to the interface system 205, which may be provided, for instance, in the form of an xbar switch. Thus, in this case, the machine code representations 271 may be directly obtained from the translator 269A and may be stored in the memory module 269C, from which respective instructions may be retrieved by the CPU 201 when running in its native operational mode.

Figure 2E:
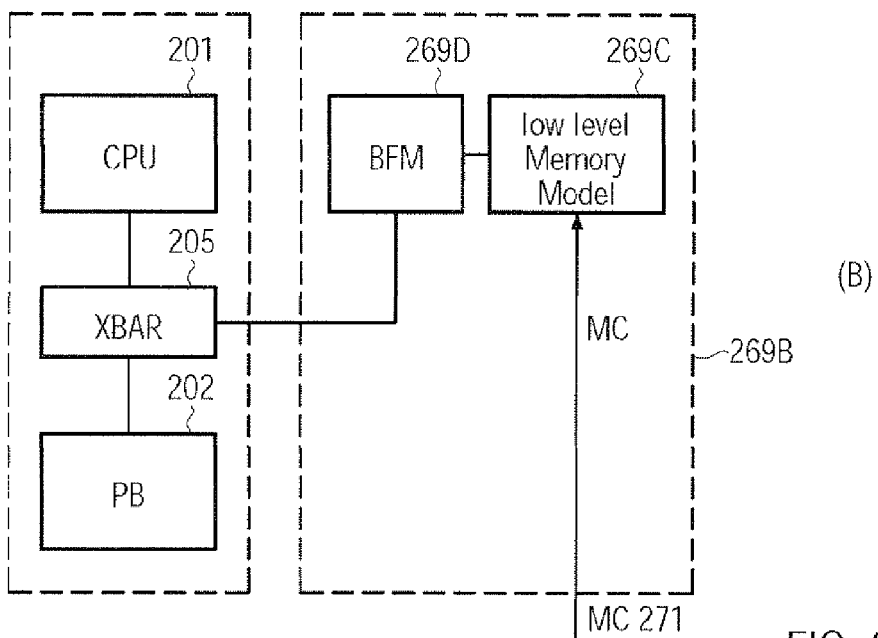

FIG. 2e schematically illustrates the interface 269B according to a further illustrative embodiment in which the device 200 may not comprise an explicit memory controller, such as the controller 103 as shown in FIG. 2d. In this case, the interface 269B may comprise, in addition to the low level memory module 269C, a bus functional model (BFM) 269D that is appropriate for interfacing with the system 205 in order to allow full access of the model 269C by the CPU 201. Also, in this case, the machine code representations 271 may be directly stored in the memory model 269C, whereas, contrary to the embodiment of FIG. 2d, the intermediate interface 269C may provide the desired full accessibility. It should be appreciated that the embodiment of FIG. 2e may also be used in combination with a memory controller 103 as is, for instance, shown in FIG. 2d, when full access of the memory model 269C via the memory controller 103 may not be guaranteed.

Figure 2F:
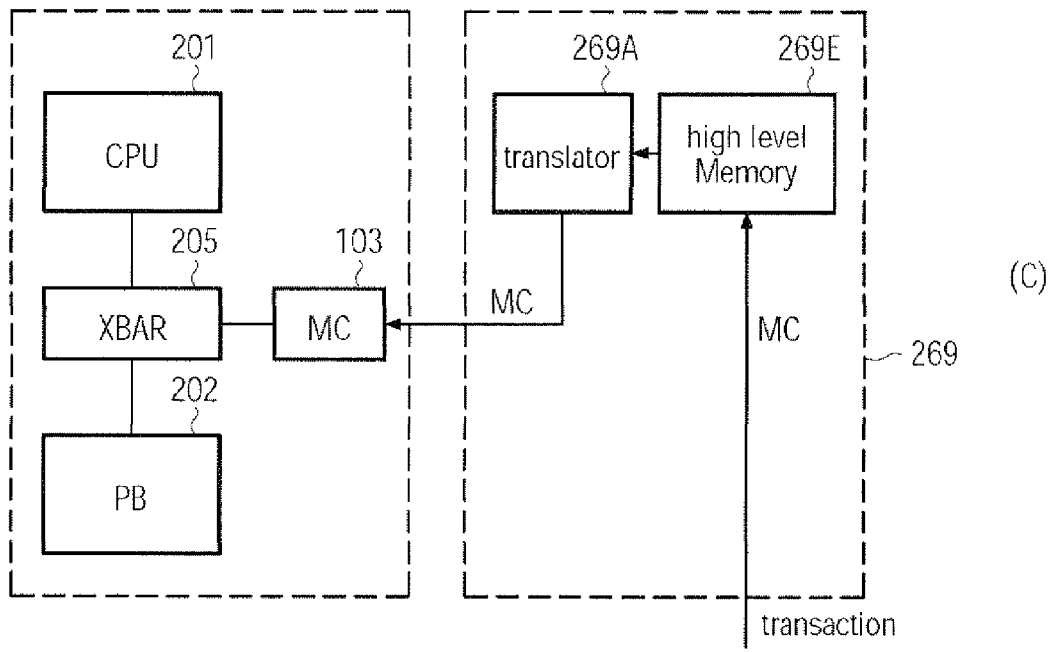

FIG. 2f schematically illustrates the module 269 (FIGS. 2a, 2b) according to further illustrative embodiments in which a low level or native memory model for the device 200 may not be available. In this case, a high level memory model 269E may be provided which may be connected to the transaction generator 262 so as to receive the transactions 270 therefrom. Moreover, the translator 269A may be operatively connected to the higher level memory model 269E in order to retrieve the stored transactions 270 and convert the same into the respective machine code representations 271. The machine code instructions may be retrieved by the CPU 201 via the memory controller 103 wherein the transfer speed may be determined by the translator 269A.

Figure 2G:
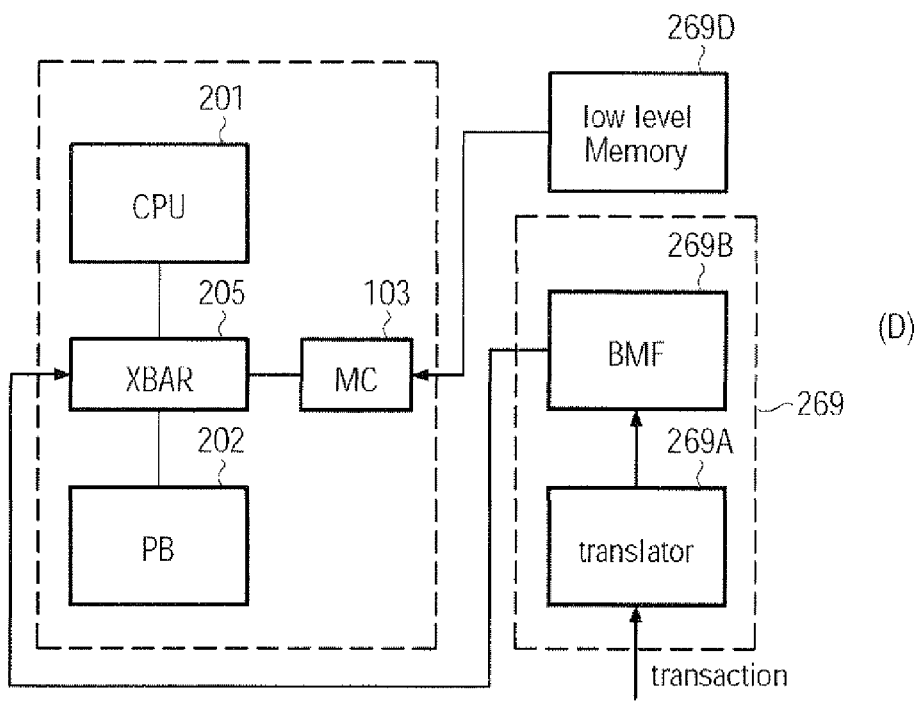

FIG. 2g schematically illustrates the module 269 according to further illustrative embodiments in which the transaction generator 262 may not have access to the low level memory model 269D. In this case, the interface 269 may be provided in the form of a bus functional model connected to the interface system 205 so as to drive the machine code representations obtained from the translator 269A into the interface system 205. For this case, a special handshake procedure, i.e., memory semaphores, FIFOs, read/write pointers etc., may be used to indicate to the CPU 201 which specific instructions are to be executed and to indicate to the interface 269B when to provide further translated transactions to the interface system 205 and thus to the low level memory model 269D. On the other hand, the CPU 201, running in its native mode, may poll the memory model 269D for executable instructions.

Figure 2H:
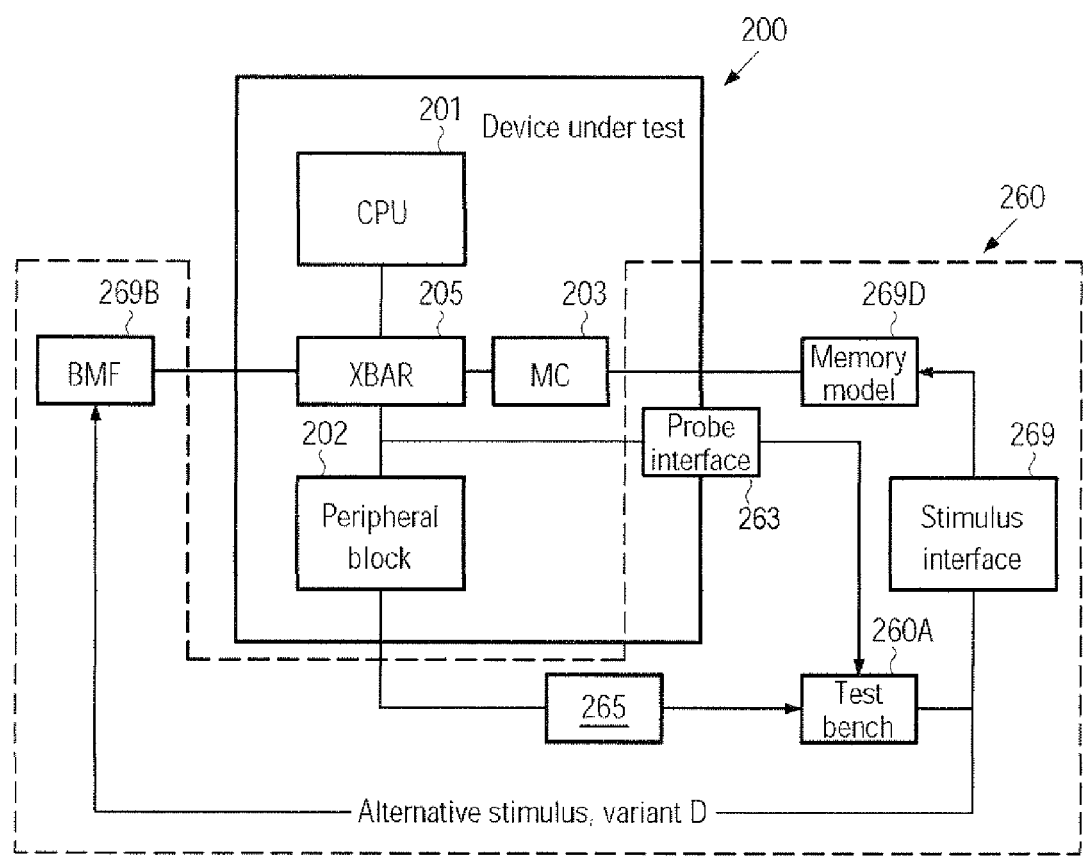
FIG. 2h schematically illustrates a transaction-based test environment having a configuration for re-use, for instance for testing a system as a whole and separated peripheral components, according to still further illustrative embodiments.

FIG. 2h schematically illustrates the semiconductor 200 in combination with the transaction-based test environment 260 according to further illustrative embodiments in which the test environment may be configured so as to enable testing of the device 200 on a block level and also on a system level. For this purpose, the test environment 260 may comprise a module 260A, which may comprise a test controller, a transaction generator and a check module, as is, for instance, shown and described with reference to FIG. 2a in the form of the modules 261, 262 and 267. Furthermore, the module 269 may be connected to the module 260A so as to provide a stimulus in the form of machine code instructions to the device 200. For this purpose, the configurations as described with reference to FIGS. 2d-2f may be implemented for the module 269 in combination with a memory model 269D. Alternatively, the module 269 may be configured as described with reference to FIG. 2g, i.e., the machine code translator 269A may be positioned in the module 269 as shown in FIG. 2h, and may be connected to the interface 269B, which may represent a bus functional model so as to inject machine code instructions into the system 205 and finally into the memory model 269D, as previously explained. Thus, in this configuration, the test environment 260 may be adapted to perform verification of the CPU 201 on transaction level, as previously described. Additionally, the test environment 260 may comprise an interface 263, for instance provided in the form of a bus functional model, adapted to translate transactions into bus signals to probe the peripheral device 202, as is also described with reference to FIG. 1c.

In other illustrative embodiments, the interface 263 may additionally be configured so as to enable the translation of bus signals into transactions that may be forwarded to the module 260A for further evaluation on transaction level. Furthermore, the environment 260 may comprise a monitor 265 that is configured to translate bus signals into transactions, which may also be forwarded to the module 260A for further evaluation. Thus, by means of the module 260A, the interface 263 and the monitor 265, a transaction-based verification of the peripheral block 202 may be accomplished in a similar manner as is described with reference to FIG. 1c when referring to the transaction-based environment 160 for verifying the functional block 102. Consequently, the test environment 260 as illustrated in FIG. 2h may be efficiently used or re-used for transaction-based verification at block level, while still providing the possibility of testing the device 200 on system level including the CPU 201, as previously described.

Again referring to FIGS. 2a and 2c, it should be appreciated that the transaction check unit 267 may be configured to check transactions to and/or from the CPU 201 via the monitor 264 and via a connection 267A. Moreover, the transaction check unit 267 may also be connected to interfaces inside peripheral block elements of block 202 or to interfaces not directly connected to the CPU 201. These interfaces may also be represented by 205. This input may also be used to constrain the transaction stream produced by the transaction generator 262.

In other aspects, a self-test mechanism may be incorporated into the test scenario and finally into the target platform. For instance, a flow may be established for identifying appropriate transactions and using the test environment to provide the transactions via the transaction generator and the machine code translator. Hence, a self-test code may be embedded into the generated machine code, possibly based on a reference model. This code is configured to detect errors in the design possibly based on manufacturing errors. The self-test machine instructions may be traced and stored in a low-level memory model of the test environment, which may also comprise a test bench for simulating the behavior of the destination platform of the design under consideration, for instance, a computer main board. The stored self-test code may be stored in real memory (RAM, ROM, etc.) of the destination platform to perform an on-board functional production test.

As a result, the present invention provides efficient verification techniques and respective test benches for performing transaction-based verification for individual blocks of a system while also enabling transaction-based verification on system level. For this purpose, a transaction-based test environment comprises a transaction to machine code translator, which may provide respective machine code instructions in a memory area that is accessible by the CPU under test. Hence, full constraint driven test strategies may be applied at block level and system level, while additional efforts for modifying the transaction-based test environment may be maintained at a low level.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A test environment for verifying a design of a semiconductor device including a central processing unit and an interface system operatively connected to said central processing unit, the test environment comprising:
   a transaction generator configured to generate a stream of transactions;
   a translator unit operatively connected to said transaction generator to receive said stream of transactions therefrom, said translator unit being configured to provide a machine code representation for each of said transactions to provide executable instructions for said central processing unit to operate said central processing unit in its native mode;
   a machine code interface configured to receive said machine code representations and to enable access to at least some of said machine code representations by said central processing unit; and
   a transaction check unit configured to receive and verify a response transaction representing a response of said central processing unit, said transaction check unit being further configured to compare the received response and a reference model representing an expected behavior of the at least one of said central processing unit.

2. The test environment of claim 1, wherein said transaction check unit is further configured to verify CPU transactions, wherein said CPU is at least one of a target and a source of said CPU transactions.

3. The test environment of claim 1, further comprising a test control unit operatively connected to said transaction generator and configured to control said transaction generator to provide said stream of transactions as a randomly constrained stream of transactions.

4. The test environment of claim 3, wherein said transaction check unit is operatively connected to said test control unit and wherein said test control unit is further configured to control said transaction generator on the basis of information provided by said transaction check unit.

5. The test environment of claim 1, further comprising a secondary interface that is connected to said transaction check unit.

6. The test environment of claim 5, wherein said secondary interface is not directly accessible by said CPU.

7. The test environment of claim 5, wherein said secondary interface is a part of a peripheral block.

8. The test environment of claim 1, further comprising a memory module accessible by said central processing unit via a memory controller, said memory module being configured to receive said machine code representations from said machine code interface.

9. The test environment of claim 1, further comprising a memory module configured to receive said machine code representations from said machine code interface, and a memory interface connected to said memory module and configured to be connectable to said interface system to enable said central processing unit to access said memory module via said interface system and said memory interface.

10. The test environment of claim 1, further comprising a memory module accessible by said transaction generator, wherein said translator unit is connected to said memory module and said machine code interface is configured to be accessible by a memory controller.

11. The test environment of claim 1, further comprising a memory module accessible by said central processing unit via said interface system and a memory controller connected thereto, wherein said machine code interface is configured to store said machine code representations in said memory module via said interface system.

12. The test environment of claim 1, further comprising a monitor module configured to convert bus signal waveforms into transactions, wherein said monitor module is connected to said transaction check unit so as to receive a response from said interface system.

13. A method of performing a transaction-based verification of a semiconductor device in a design state, the method comprising:
   creating a first plurality of transactions representing communication events between a central processing unit and a peripheral functional block of said semiconductor device;
   generating machine code instructions from said first plurality of transactions, said machine code instructions containing at least some instructions executable by said central processing unit;
   supplying said at least some executable instructions to said central processing unit to operate said central processing unit in its native mode; and
   checking a response of at least one of said peripheral functional block and the central processing unit to obtain verification information, said response being caused by executing said at least some instructions by said central processing unit, wherein checking the response includes comparing the response with a reference model representing an expected behavior of said at least one of said peripheral functional block and the central processing unit.

14. The method of claim 13, further comprising creating a second plurality of transactions by adapting the first plurality of transaction on the basis of said verification information and generating machine code instructions from said second plurality of transactions.

15. The method of claim 13, wherein checking a response of at least said peripheral functional block comprises obtaining data of said peripheral functional block on a signal level, converting said data into a transaction level and evaluating said data on said transaction level.

16. The method of claim 13, wherein creating said first plurality of transactions comprises creating said first plurality of transactions by using a randomizing mechanism.

17. The method of claim 13, wherein generating said machine code instructions and enabling access by said central processing unit comprises storing said machine code instructions in a memory module accessible by said central processing unit and causing said central processing unit to access said memory module.

18. The method of claim 17, wherein said memory module is accessed via a memory controller of said semiconductor device.

19. The method of claim 17, further comprising providing an interface module that is configured to communicate with an internal interface system of said semiconductor device and accessing said memory module via said interface module.

20. The method of claim 13, wherein generating said machine code instructions and enabling access by said central processing unit comprises storing said first plurality of transactions in a memory module and converting transactions into machine code instructions and machine code instructions into transactions when accessing said memory module by said central processing unit.

21. The method of claim 13, wherein generating said machine code instructions and enabling access by said central processing unit comprises storing said machine code instructions in a memory module via an internal interface system and a memory controller of said semiconductor device.

22. The method of claim 13, further comprising performing a transaction-based verification process for verifying a functional behavior of said functional peripheral block.

23. The method of claim 13, wherein at least some components of said semiconductor device are provided in the form of a re-configurable representation.

24. The method of claim 13, wherein said peripheral functional block comprises an embedded functional block operatively connected to said central processing unit by a device internal interface system.

25. The method of claim 13, further comprising incorporating self-test code into said sequence of transactions and storing a machine code version of said self-test code in a memory model.

26. The method of claim 25, further comprising providing the reference model for said self-test code.

27. The method of claim 25, wherein said self-test code is configured to detect design errors.

28. The method of claim 27, further comprising simulating a behavior of a destination environment of said semiconductor device and using said machine code version of said self-test code for performing a self-test.

* * * * *